(12) United States Patent
Ryu et al.

(10) Patent No.: US 7,715,301 B2
(45) Date of Patent: May 11, 2010

(54) WAVE PLATE

(75) Inventors: Homin Ryu, Tochigi (JP); Hajime Kurahashi, Tochigi (JP); Takahiko Matsuba, Tochigi (JP); Yoshiji Kawamura, Tochigi (JP)

(73) Assignee: Fujinon Corporation, Saitama-shi (JP)

( * ) Notice: Subject to any disclaimer, the term of this patent is extended or adjusted under 35 U.S.C. 154(b) by 806 days.

(21) Appl. No.: 11/470,102

(22) Filed: Sep. 5, 2006

(65) Prior Publication Data

US 2007/0053271 A1    Mar. 8, 2007

(30) Foreign Application Priority Data

Sep. 6, 2005    (JP)    ............... 2005-257737

(51) Int. Cl.
*G11B 7/135*    (2006.01)
(52) U.S. Cl. ................................. 369/112.16
(58) Field of Classification Search ........................ None
See application file for complete search history.

(56) References Cited

U.S. PATENT DOCUMENTS

| | | | | |
|---|---|---|---|---|
| 4,399,529 A | * | 8/1983 | Leterme et al. ........ | 369/112.17 |
| 5,004,326 A | * | 4/1991 | Sasaki ................... | 369/110.04 |
| 5,099,470 A | * | 3/1992 | Matsubayashi ........ | 369/110.04 |
| 5,157,649 A | * | 10/1992 | Suzuki ................... | 369/112.21 |
| 5,777,975 A | * | 7/1998 | Horinouchi et al. .... | 369/112.19 |
| 6,014,359 A | * | 1/2000 | Nagano ................. | 369/112.07 |
| 7,417,937 B2 | * | 8/2008 | Nagashima ............ | 369/112.17 |
| 2003/0076766 A1 | * | 4/2003 | Nagata et al. .......... | 369/112.19 |
| 2004/0145995 A1 | * | 7/2004 | Saito et al. ............. | 369/110.02 |

FOREIGN PATENT DOCUMENTS

| | | |
|---|---|---|
| JP | 03-078704 | 4/1991 |
| JP | 2001-124925 | 5/2001 |

\* cited by examiner

*Primary Examiner*—Peter Vincent Agustin
(74) *Attorney, Agent, or Firm*—Oblon, Spivak, McClelland, Maier & Neustadt, L.L.P.

(57) ABSTRACT

An optical element having an optical multi-layer coating which can function as a phase plate without using quartz crystal or an optical film. The optical multi-layer coating is deposited on a plane which is set up on the optical element by way of a perpendicularly intersecting plane located on perpendicularly intersecting X- and Y-axes in perpendicularly intersecting relation with optical axis of an incident light beam on the optical multi-layer coating, the perpendicularly intersecting plane being inclined through a predetermined angle about the X- and/or Y-axis to establish a phase differential between two linearly polarized components of the incident light beam.

10 Claims, 6 Drawing Sheets

WAVE PLATE

BACKGROUND OF THE INVENTION

1. Field of the Art

This invention relates to an optical element with an optical multi-layer deposition film to serve as a phase plate, and an optical pickup to which the optical element is applied.

2. Prior Art

Optical pickups are in general use for reproducing and recording optical discs such as CD (compact disc), DVD (Digital Versatile Disc) and the like. As an example of optical pickup, there has been known an optical pickup system which is composed of a light source, collimator lens, polarized beam splitter, λ/4 phase plate, objective lens, condenser lens, and a detector. In such an optical pickup system, a p-polarized light beam (polarized in a direction parallel with a plane of incidence) or an s-polarized light beam (polarized in a direction perpendicular to p-polarized light) which is projected from a light source is collimated into a parallel light beam by a collimator lens and fed to a polarized beam splitter. The polarized beam splitter transmits either p- or s-polarized light only while reflecting off other polarization components. (In this particular case, the polarized beam splitter transmits p-polarized light only and reflects off s-polarized light.) The p-polarized light component transmitted through the polarized beam splitter is fed to a λ/4 phase plate. At the λ/4 phase plate, p-polarized light is converted into circularly polarized light and converged to a spot on an optical disc by an objective lens.

Circularly polarized light which is reflected off a disc surface is passed through the objective lens as return light and once more fed to the λ/4 phase plate. At the λ/4 phase plate, the return light is converted from circularly polarized light to s-polarized light, and resulting s-polarized light is fed to the polarized beam splitter which has characteristics of reflecting off s-polarized light. The reflected s-polarized light is directed toward a sensor for information reproducing or recording purposes.

Thus, as described above, a λ/4 phase plate is one of essential constituent elements of an optical pickup. By the λ/4 phase plate, incident p- and s-polarized light components are rotated to undergo a 90 degrees shift in phase. Therefore, incident light is converted from linearly polarized light to circularly polarized light. Similarly, the return light from a disc undergo again a 90 degrees phase shift through the λ/4 phase plate, and thereby converted from circularly polarized light to linearly polarized light. In this instance, on the way from a light source, p-polarized light is shifted 90 degrees in phase by the λ/4 phase plate, and shifted again 90 degrees in phase on the way back from an optical disc. That is to say, the light beam which is fed to the polarized beam splitter as return light is shifted 180 degrees in phase in total and converted to s-polarized light, as compared with the p-polarized light beam initially projected from the light source.

On the other hand, there is a λ/2 phase plate is used for a 180 degrees phase shift. By shifting the phase 180 degrees, a λ/2 phase plate rotates the direction of polarization by 90 degrees.

In order to utilize functions of these λ/4 and λ/2 phase plates (and other phase plates), it is necessary to use materials of different refractive indices respectively for p- and s-polarized light for the purpose of differentiating propagation velocity of p-polarized light from that of s-polarized light. As a material which can serve for this purpose, Japanese Laid-Open Patent Application 2001-124925 discloses an optical film, while Japanese Laid-Open Patent Application H3-78704 discloses quartz crystal.

Both the optical film and quartz crystal which are disclosed in Japanese Laid-Open Patent Applications 2001-124925 and H3-78704 have crystallinity and can function as a phase plate. Namely, by the action of crystal axis formed in the film or quartz crystal, a phase differential is established between perpendicularly intersecting phase advancing axis and phase retarding axis of incident light. That is to say, in these cases, crystallinity is utilized for obtaining functions as a phase plate. That is to say, in the case of conventional phase plates, crystal axis has been necessary for performing functions as a phase plate.

In the case of Japanese Laid-Open Patent Application 2001-124925, a cyclic polyolefin-base resin film is bonded on a surface of a substrate for the purpose of improving heat resistance and hygroscopic property as a phase plate. However, the cyclic polyolefin-base resin film itself has a large thermal expansion coefficient, so that it causes distortions of the film as well as degradations of optical characteristics under high temperature conditions. Therefore, for an optical film to function as a phase plate, it still has problems from the standpoint of weatherability. Besides, in the case of Japanese Laid-Open Patent Application H3-78704 using quartz crystal as a phase plate material, it is difficult to realize phase plates of a large size due to difficulties of obtaining crystals with a large surface area.

SUMMARY OF THE INVENTION

With the foregoing situations in view, it is an object of the present invention to provide an optical element with an optical multi-layer deposition film which can function as a phase plate, without using quartz crystal or an optical film.

According to the present invention, in order to achieve the above-stated objective, there is provided an optical element having a plane coated with an optical multi-layer coating formed by alternately depositing a high refractivity layer and a low refractivity layer one on another, the plane being set up by way of a perpendicularly intersecting plane located on perpendicularly intersecting X- and Y-axes in perpendicularly intersecting relation with optical axis of an incident light beam on the optical multi-layer coating, and the perpendicularly intersecting plane being inclined through a predetermined angle about the X- and/or Y-axis to establish a phase differential between two linearly polarized components of the incident light beam.

In the case of the optical element just described, regarding the optical axis as Z-axis, a plane of incidence of the incident light beam on the optical multi-layer coating or the optical multi-layer coating itself is rotated about the Z-axis through a predetermined angle to let the optical multi-layer coating function as a phase plate.

According to the present invention, there is also provided an optical element, which comprises: first and second optical multi-layer coatings each being formed by alternately depositing a high refractivity layer and a low refractivity film one on another; a first inclined plane set up by way of a perpendicularly intersecting plane located on perpendicularly intersecting X- and Y-axis in perpendicularly intersecting relation with optical axis of an incident light beam on the first and second optical multi-layer coating and inclined through a predetermined angle about the X- and/or Y-axis; and a second inclined plane inclined through a predetermined angle about the X- and/or Y-axis in an opposite direction to take a symmetrical position relative to the first inclined plane; the first optical multi-layer coating being deposited on the first inclined plane and the second optical multi-layer coating being deposited on the second inclined plane to establish a predetermined phase differential between two linearly intersecting polarized components of a light beam incident on the first and second optical multi-layer coatings.

In the case of the optical element just described, regarding the optical axis as Z-axis, the first inclined plane is rotated about the Z-axis through a predetermined angle relative to a first plane of incidence defined by a normal to the first incline plane and the optical axis to provide a first rotated inclined plane, and the second inclined plane is rotated about the Z-axis through a predetermined angle relative to a second plane of incidence defined by a normal to the second inclined plane and the optical axis, the first and second optical multi-layer coatings being formed on the first and second rotated inclined planes, respectively, to let the optical multi-layer coatings function as a phase plate.

Further, according to the present invention, there is provided an optical pickup employing any one of optical elements described above, comprising, in combination with the optical element adapted to function as a λ/4 phase plate, a light source adapted to emit an X-polarized light beam polarized in the direction of X-axis or a Y-polarized light beam polarized in the direction of Y-axis, a polarized beam splitter adapted to transmit one of X- and Y-polarized light beams and to reflect off the other one of the X- and Y-polarized light beams, an objective lens adapted to converge a transmitted light beam from the optical element toward a disc surface, and a sensor adapted to detect return light from the objective lens.

Further, according to the present invention, there is also provided an optical pickup employing any one of optical elements described above, comprising, in combination with the optical element adapted to function as a λ/4 phase plate, a light source adapted to emit an X-polarized light beam polarized in the direction of X-axis or a Y-polarized light beam polarized in the direction of Y-axis, a holographic polarized element adapted to validate or invalidate a diffracting action depending upon direction of polarization of an incident light beam, an objective lens adapted to converge a transmitted light beam from the optical element toward a disc surface, and a sensor adapted to detect return light from the objective lens.

The above and other objects, features and advantages of the present invention will become apparent from the following particular description of preferred embodiments shown in the accompanying drawings. Needless to say, the present invention should not be construed as being limited to particular forms shown in the drawings.

DESCRIPTION OF PREFERRED EMBODIMENTS

Figure 1:
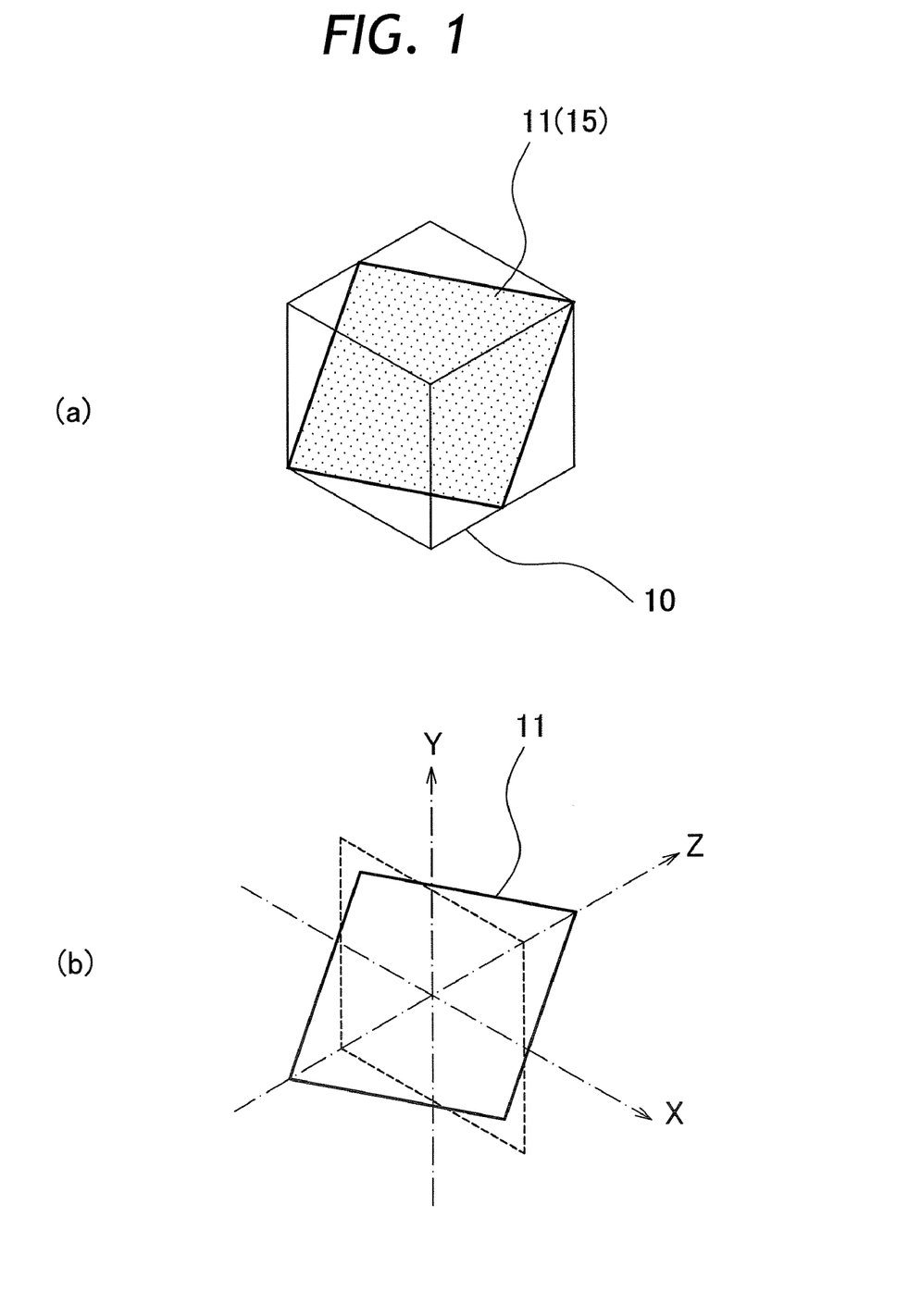
FIG. 1 is a schematic perspective view of an optical element.
Figure 2:
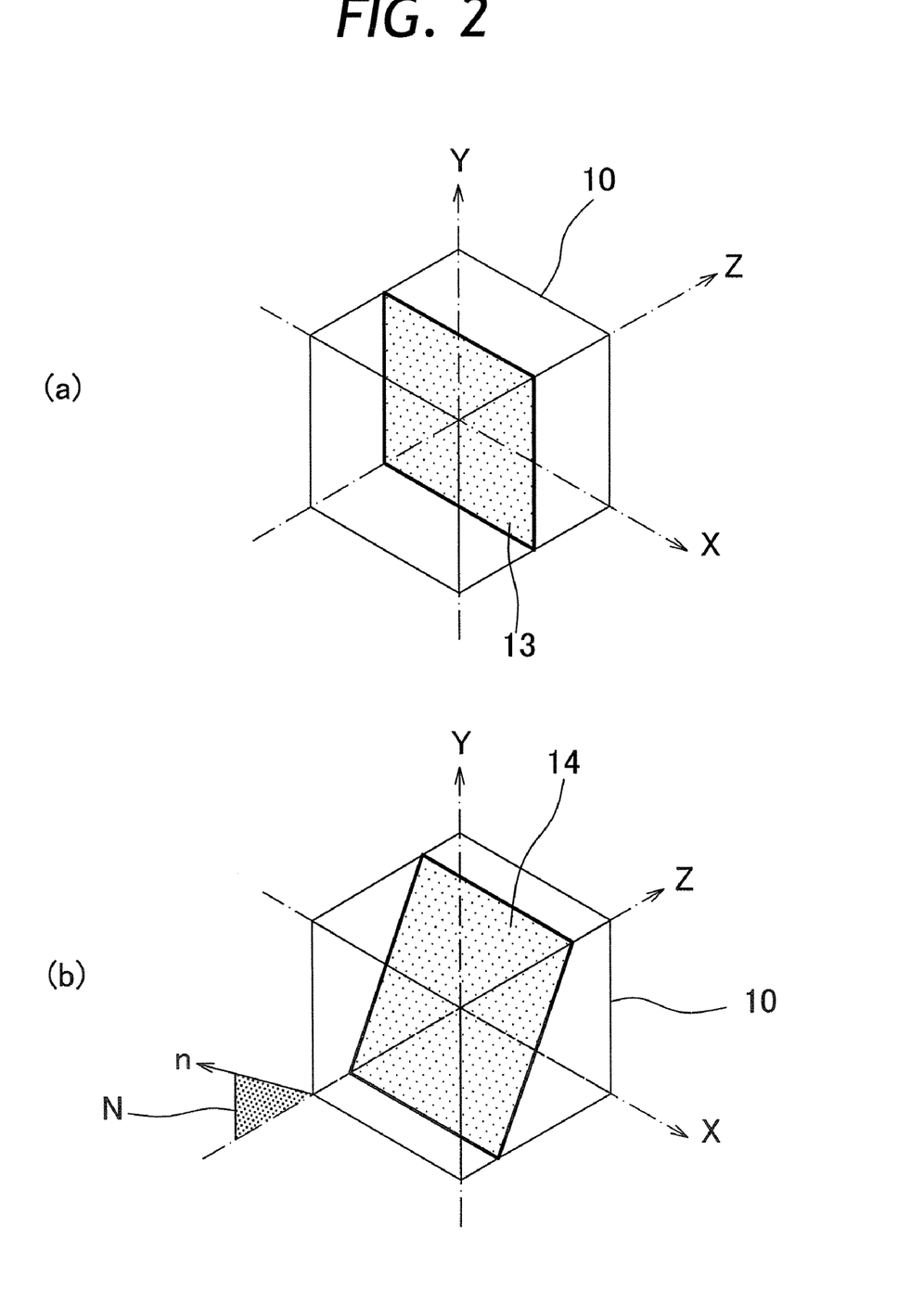
FIG. 2 is a schematic perspective view showing a perpendicularly intersecting plane, inclined plane and rotated inclined plane.

Hereafter, the present invention is described more particularly by way of its preferred embodiments. FIG. 1 shows an optical element 10 which is adapted to function as a λ/4 phase plate, while FIGS. 2(a) and 2(b) show the manner of controlling angle of an optical multi-layer coating 11 formed on the optical element 10. More specifically, FIG. 1(a) shows an optical multi-layer coating 11 on the optical element 10, while FIG. 1(b) shows the optical multi-layer coating 11 deposited on a plane on perpendicularly intersecting X-, Y- and Z-axes. (A plane which is demarcated by a broken line in FIG. 1(b), that is, an X-Y plane at Z=0.) In FIG. 1, the optical element 10 of the this embodiment has a planer optical multi-layer coating 11 internally of a substrate, for example, internally of a glass substrate in the shape of a rectangular parallelopiped or cube (a cubic substrate in the case of this particular embodiment). The optical multi-layer coating 11 can also be applied to a surface of a substrate. For the reasons as will be explained later on, the optical element 10 can perform functions of an arbitrary phase plate. For example, it can serve for functions of various phase plates including λ/4 and λ/2 phase plates. In this particular case, the optical element 10 is adapted to function as a λ/4 phase plate. In the present invention, the term "phase plate" includes λ/4 phase plate and λ/2 phase plate.

In the drawing, the optical element 10 is shown in relation with three perpendicularly intersecting axes X, Y and Z (all of axes X, Y and Z intersect with each other at right angles). The direction of Z-axis coincides with that of optical axis of a light beam incident on the optical element 10 (hereinafter referred to as "incident beam" for brevity). The perpendicularly intersecting X- and Y-axes are located on an imaginary plane which perpendicularly intersects Z-axis. In this instance, the direction of polarization of p-polarized light incident on the optical element 10 (as well as the direction of polarization of p-polarized light projected from a light source) coincides with Y-axis, while the direction of polarization of s-polarized light coincides with X-axis. Namely, the incident beam on the optical element 10 can be composed of a component which is polarized in the direction of X-axis (X-polarized light), and a component which is polarized in the direction of Y-axis (Y-polarized light). In this particular case, however, the light beam incident on the optical element 10 is composed of Y-polarized light (p-polarized light) alone. For example, an optical pickup system is normally arranged in such a way as to feed a λ/4 plate with a light beam which has been transmitted through a polarized beam splitter. A light beam which has been transmitted through a polarized beam splitter is linearly polarized light, that is, either p-polarized light (the case of the particular embodiment shown) or s-polarized light. Thus, the incident light beam on the optical element 10 consists of p-polarized light alone and contains no s-polarized light.

In order to function as a λ/4 phase plate, the optical element 10 is required to satisfy at least two conditions, namely, (1) to be able to make shifts to establish a 90 degrees phase differential between perpendicularly intersecting polarized light components (p- and s-polarized components) in a light beam incident on the optical element 10 and (2) to be able to rotate an optical multi-layer coating 11 through a predetermined angle relative to a plane of incidence of the optical multi-layer coating 11. In order to satisfy the condition (1) above, it is necessary to deposit a high refractivity film layer and a low refractivity film layer alternately on a substrate in such a way as to create a 90 degrees phase differential between p- and s-polarized light components of an incident beam. An optical layer construction which functions to satisfy the condition (1) can be realized through selection of materials for the high and low refractivity deposition layers (i.e., selection of materials with an aimed refractivity), and control of thicknesses of the high and low refractivity layers and number of alternately deposited high and low refractivity layers.

For instance, in a case where tantalum oxide and silicon oxide are selected as materials for the high and low refractivity layers, respectively, the thickness of deposition layers can be controlled through control of the deposition time of each material, while a desired number of deposition layers can be obtained by controlling the number of deposition cycles. In this regard, in order to secure functions to satisfy the condition (1) above, it is necessary for an optical multi-layer coating 11 to have approximately one hundred layers in case an angle of incidence of an incident beam on the optical multi-layer coating 11 is 30 degrees. Of course, the number of layers in the optical multi-layer coating 11 is increased or reduced depending upon the kinds or properties and thicknesses of the high and low refractivity layers, and angle of incidence of an incident beam.

Now, in order for the optical element 10 to function as a λ/4 phase plate, in addition of deposition of an optical multi-layer coating 11 which satisfy the condition (1) above, it is a mandatory requisite to rotate the optical multi-layer coating 11 through a predetermined angle relative to a plane of incidence of an incident beam (the condition (2) above).

In the first place, as shown in FIG. 2(a), a perpendicularly intersecting plane 13 is set on X-Y axes (an X-Y plane at Z=0) in perpendicularly intersecting relation with Z-axis. In this case, a plane of incidence is not formed since the optical axis of an incident beam (Z-axis) is normal to the perpendicularly intersecting plane 13. Therefore, as shown in FIG. 2(b), an inclined plane 14 which is inclined 30 degrees about X-axis and/or Y-axis (inclined 30 degrees about X-axis in the case of the particular example shown) is set in place of the perpendicularly intersecting plane 13 (by inclining a normal to the perpendicularly intersecting plane 13 30 degrees about X-axis). A plane of incidence N is formed by a normal n to the inclined plane 14 and an optical axis (Z-axis) of an incident beam. The inclined plane 14 is inclined 30 degrees about X-axis in the case of FIG. 2. However, it may be inclined through an arbitrary angle about either X- or Y-axis or it may be inclined through an arbitrary angle about both of X- and Y-axes.

In case the above-mentioned optical multi-layer coating 11 is deposited on the inclined plane 14, which is inclined 30 degrees about X-axis, a difference in propagation velocity occurs between p-polarized light (X-polarized light) and s-polarized light (Y-polarized light). Namely, since the plane 14 is inclined 30 degrees about X-axis, the optical multi-layer coating 11 has different indices of refraction for p- and s-polarized light components. In the case of the particular embodiment shown, an incident light beam on the optical element 10 is all p-polarized light. However, in case an incident light beam on the optical multi-layer coating 11 contains perpendicularly intersecting p- and s-polarized light components, a phase differential can be established between the p- and s-polarized components by controlling to this effect the design or construction of the coating 11 (including selection of deposition substances, control of thicknesses of respective layers, and control of deposition layers).

On the other hand, as mentioned above, the incident light beam on the optical element 10 is all p-polarized light and contains no s-polarized light. Accordingly, in this case the optical multi-layer coating 11 is formed on the inclined plane 14 cannot perform the functions of creating a 90 degrees phase differential between p- and s-polarized components because the incident beam is all p-polarized light as mentioned above. Namely, in this case, p-polarized light incident on the optical multi-layer coating 11 is transmitted as it is. Thus, in this case, transmitted light is not converted into circularly polarized light, and the optical element 10 does not function as a λ/4 phase plate.

This can be coped with by rotating the plane of incidence N about Z-axis relative to the inclined plane 14 so that an incident beam becomes linearly polarized light containing not only p-polarized light but also s-polarized light. Namely, observing this from the side of the inclined plane 14, a light beam incident on the inclined plane 14 undergoes a change in direction of polarization. In this instance, by controlling the angle of rotation of the plane of incidence N, it is possible to let the optical element function as a λ/4 phase plate to create a phase differential between p- and s-polarized components.

However, a light beam incident on the optical element 10 is a beam which invariably has its optical axis on Z-axis and which is p-polarized with regard to the direction of polarization. Accordingly, for the light beam incident on the optical element 10, the plane of incidence N itself cannot be rotated. Instead of rotating the plane of incidence N, the inclined plane 14 is rotated to form a rotated inclined plane 15. Namely, relative to the plane of incidence N which is fixed, the inclined plane 14 is rotated. By so doing, it becomes possible to virtually rotate the plane of incidence N relative to the inclined plane 14. At this time, the inclined plane 14 is rotated relative to the fixed plane of incidence N through a predetermined angle (through 45 degrees in the case of the particular embodiment shown). Thereafter, an optical multi-layer coating 11 is formed on the rotated inclined plane 15. A light beam incident on the optical multi-layer coating 11 is transmitted through, making p-polarized light act as a phase advancing or retarding axis and s-polarized light as a phase retarding or advancing axis (in this case, p-polarized light acts as a phase advancing axis while s-polarized light acts as a phase retarding axis). Upon transmission, a 90 degrees phase differential is established between p- and s-polarized components of transmitted light, so that transmitted light is converted to circularly polarized light. Thus, despite absence of a crystal axis, phase advancing and retarding axes can be provided. In order to let p-polarized light act as a phase advancing or retarding axis and s-polarized light as a phase retarding or advancing axis, it suffices to rotate the inclined plane 14 relative to the plane of incidence N. It follows that, in case a light source is rotatable (i.e., in case direction of polarization of a light beam from a light source is rotatable), there is no need for rotating the inclined plane 14.

Thus, the present invention succeeded in realizing a λ/4 plate by the use of an optical multi-layer coating instead of using quartz crystal or an optical film medium, i.e., (1) by forming an optical multi-layer coating capable of establishing a 90 degrees phase differential between p- and s-polarized light components and (2) rotating the optical multi-layer coating and a plane of incidence of the optical multi-layer coating 11 to an angular position suitable for functioning as a λ/4 phase plate. In this instance, it is possible to let the optical element 10 function as a λ/2 phase plate, (1) by forming the optical multi-layer coating 11 in a layer construction so arranged as to establish a 180 degrees phase differential between p- and s-polarized components, and (2) by rotating the optical multi-layer coating 11 through a predetermined angle relative to the plane of incidence to the optical multi-layer coating. Of course, it is possible to realize a λ/8 phase plate or other arbitrary phase plate by the use of an optical element which satisfies the conditions (1) and (2) above.

In the present embodiment, by way of example the optical multi-layer coating 11 is formed on an optical element 10 of a cubic shape. Of course, the optical multi-layer coating 11 may be formed on a flat plate-like substrate. In any case, the optical multi-layer coating 11 should be inclined and rotated through a predetermined suitable angle to function as a phase plate.

Further, the optical element 10 in the present embodiment can be reduced in thickness. For instance, the thickness of the optical element 10 in the direction of Z-axis in FIG. 1 can be halved by folding back the optical multi-layer coating 11 at the boundaries of an X-Z plane. Namely, the thickness of the optical element 10 can be halved by folding the optical multi-layer coating 11 through the same angle in the opposite direction at the top of an X-Z plane. If folded in series three times or at three positions, the thickness can be minimized to ¼. Of course, the thickness can be further minimized by increasing the number of folding positions.

As explained above, according to the present embodiment, functions of a phase plate can be obtained by the use of an optical multi-layer coating, without using quartz crystal or an optical film. Thus, it becomes possible to fabricate large phase plates of excellent weatherability.

Example 1

Figure 3:
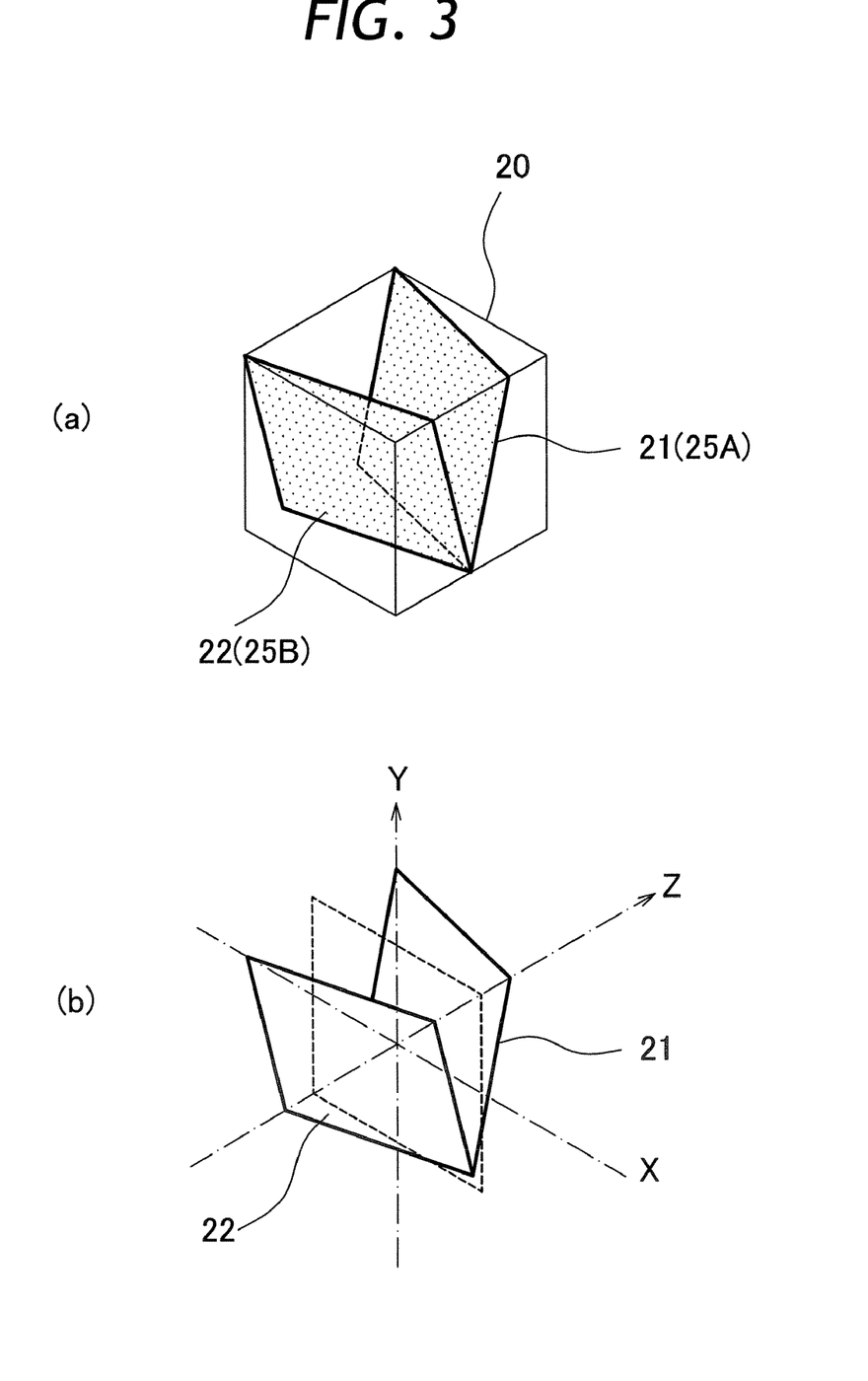
FIG. 3 is a schematic perspective view of an optical element in Example 1.

This example deals with an optical element 20 which has a couple of optical multi-layer coatings, i.e., a first optical multi-layer coating 21 and a second optical multi-layer coating 22. The optical element 20 of this example differs from the optical element 10 of the above-described embodiment in that it has two optical multi-layer coatings. The optical element 20 is adapted to function as a λ/4 phase plate which converts linearly polarized light to circularly polarized light. A light beam incident on the optical element 20 is converted from linearly polarized light to circularly polarized light by transmission through the two optical multi-layer coatings, namely, through the first and second optical multi-layer coatings 21 and 22. In this case, the optical axis of a light beam incident on the optical element 20 also coincides with Z-axis, and perpendicularly intersecting X- and Y-axes are set on an X-Y plane which perpendicularly intersects Z-axis. Further, a light beam incident on the optical element 20 is linearly polarized light which is polarized only in one direction (p-polarized light in this case).

In order for the optical element 20 to function as a λ/4 phase plate, similarly to the optical element 10 of the above-described embodiment, it is required to meet the following two conditions, i.e., (1) to be able to establish a 90 degrees phase differential between perpendicularly intersecting polarized components (between p- and s-polarized components) of a light beam incident on the optical element 20, and (2) to be able rotate the first and second optical multi-layer coatings 21 and 22 through a predetermined angle relative to a plane of incidence of a light beam incident on the first and second optical multi-layer coatings 21 and 22. In order to satisfy the condition (1) above, each one of the first and second optical multi-layer coatings 21 and 22 should have a multi-layer construction which is formed by alternately depositing a layer of high refractivity material and a layer of low refractivity material one on another. In this regard, the optical element 10 of the above-described embodiment is arranged to establish a 90 degrees phase differential between p- and s-polarized components of an incident beam by the use of a single optical multi-layer coating 11. However, in this Example 1, the first and second optical multi-layer coatings 21 and 22 are so arranged as to function collectively and cooperatively to establish a 90 degrees phase differential between p- and s-polarized components of an incident beam. Namely, in this case, each one of the first and second optical multi-layer coatings 21 and 22 is arranged to establish a 45 degrees phase differential between p- and s-polarized components (i.e., each functioning as a λ/8 phase plate).

Figure 4:
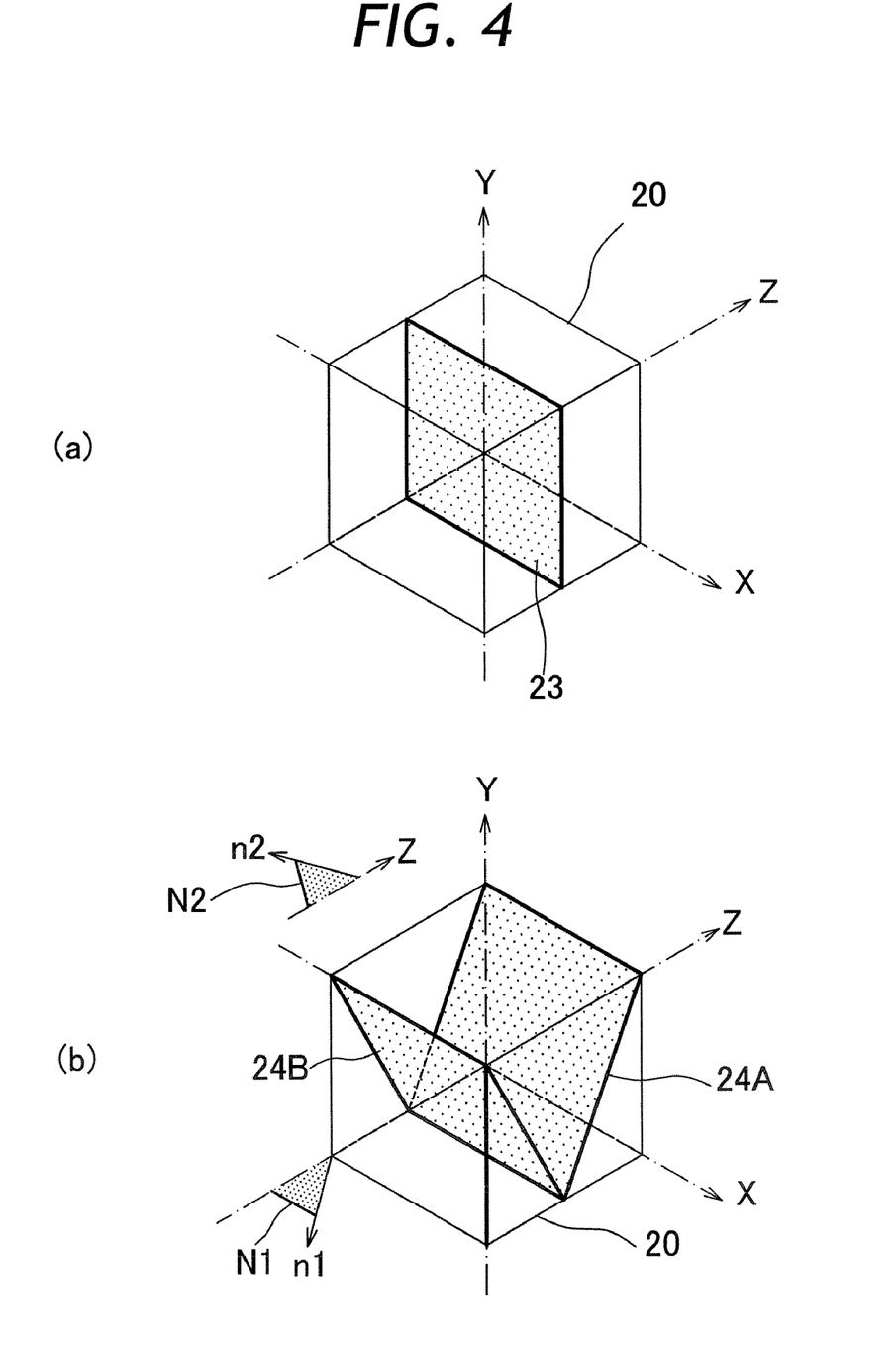
FIG. 4 is a schematic perspective view showing a perpendicularly intersecting plane, inclined plane and rotated inclined plane in Example 1.

Now, in order to satisfy the condition (2) above, a perpendicularly intersecting plane 23 is imaginarily set on an X-Y plane at Z=0 as shown in FIG. 4(a). Then, as shown in FIG. 4(b), the perpendicularly intersecting plane 23 is inclined about X-axis through a predetermined angle to make a first inclined plane 24A (inclined 30 degrees in the case of the particular example shown). Simultaneously, the perpendicularly intersecting plane 24 is inclined about X-axis through the same angle but in the opposite direction as compared with the first inclined plane 24A to make a second inclined plane 24B (inclined −30 degrees in the case of the particular example shown). Thus, the first and second inclined planes 24A and 24B are disposed symmetrically on the opposite sides of the perpendicularly intersecting plane 24. In this instance, when a light beam containing p- and s-polarized components is cast on the first and second optical multi-layer coatings 21 and 22, it is possible to make a predetermined phase differential between p- and s-polarized components of the incident beam in case the first and second optical multi-layer coatings 21 and 22 are formed on the first and second inclined planes 24A and 24B, respectively. Namely, similarly to the above-described embodiment, it is possible to establish a phase differential between p- and s-components which have different indices of refractivity and thus differ from each other in propagation velocity. It is necessary to control the properties and construction of the optical multi-layer coatings 21 and 22 (including selection of deposition materials, control of layer thickness, control of the number of deposition layers) and to control the angle of inclination as well in order to establish an aimed phase differential between p- and s-polarized components.

On the other hand, in the case of the present Example, linearly polarized light containing p-polarized light alone is fed to the first and second inclined planes 24A and 24B. In this case, it is impossible to establish a 90 degrees phase differential between p- and s-polarized components because the incident light beam contains no s-polarized light.

Therefore, a rotated inclined plane 24A is set up by rotating the first inclined plane 24A through a certain angle (45 degrees in the case of the particular example shown) relative to a first plane of incidence N1 which is formed by a normal n1 to the first inclined plane 24 and the optical axis, and another rotated inclined plane 25B is set up by rotating the second inclined plane 24B through a certain angle (45 degrees in the case of the particular example shown) relative to a second plane of incidence N2 (which is shown in the drawing in a translated position). A first optical multi-layer coating 21 is deposited on the rotated inclined plane 25A while a second optical multi-layer coating 22 is deposited on the rotated inclined plane 25B, obtaining an optical element 20 as shown in FIG. 3. Shown in FIG. 3(a) is an optical element 20 on which the first and second optical multi-layer coatings are formed, while shown in FIG. 3(b) are the first and second optical multi-layer coatings 21 and 22 in relation with the perpendicularly intersecting axes X, Y and Z. A plane which is demarcated by a broken line in FIG. 3(b) is an X-Y plane at Z=0.

Both the first rotated inclined plane 25A and the second rotated inclined plane 25B are rotated through a predetermined angle relative to the first and second planes of incidence N1 and N2, respectively. Therefore, of a light beam which is incident on the first and second optical multi-layer coatings 21 and 22, p-polarized component is transmitted as a phase advancing or retarding axis while s-polarized component is transmitted as a phase retarding or advancing axis. In this case, there is a 90 degrees phase differential between p- and s-polarized components of transmitted light. Thus, without using a crystal axis, the optical element is imparted with functions of phase advancing and retarding axes.

In this Example, in order to let a p-polarized component act as a phase advancing or retarding axis and an s-polarized component as a phase retarding or advancing axis, similarly it suffices to rotate the first and second inclined planes 24A and 24B relative to the first and second planes of incidence N1 and N2, respectively. Therefore, in case a light source is rotatable (i.e., if direction of polarization of a light beam from a light source is rotatable), there is no need for rotating the inclined planes 24A and 24B.

Of course, even in this Example, it is possible to let the optical element 20 function as a λ/2 phase plate, a λ/4 phase plate or other arbitrary phase plate (1) through control of the multi-layer construction of the first and second optical multi-layer coatings 21 and 22 and (2) through control of the rotation angle of the first and second optical multi-layer coatings 21 and 22.

As compared with the optical element 10 of the above described embodiment, the optical element 20 of this Example (with a couple of optical coatings) is superior from the standpoint of angle dependency. Namely, the first optical multi-layer coating 21 of the optical element 20 is inclined and rotated relative to an incident light beam to give rise to angle dependency. However, since the second optical multi-layer coating 22 is formed symmetrically relative to the first optical multi-layer coating 21, it has an effect of canceling the angle dependency arising from the first optical multi-layer coating 21. Thus, the optical element 20 is superior in angle dependency.

Further, even in this Example, instead of the cubic optical element 20, the first and second optical multi-layer coating 21 and 22 may be formed on a substrate of a flat plate-like shape.

According to the present Example, as described above, a phase plate can be realized by the use of optical multi-layer coatings without using an optical film or quartz crystal, making it possible to fabricate large phase plates with excellent weatherability.

Example 2

Figure 5:
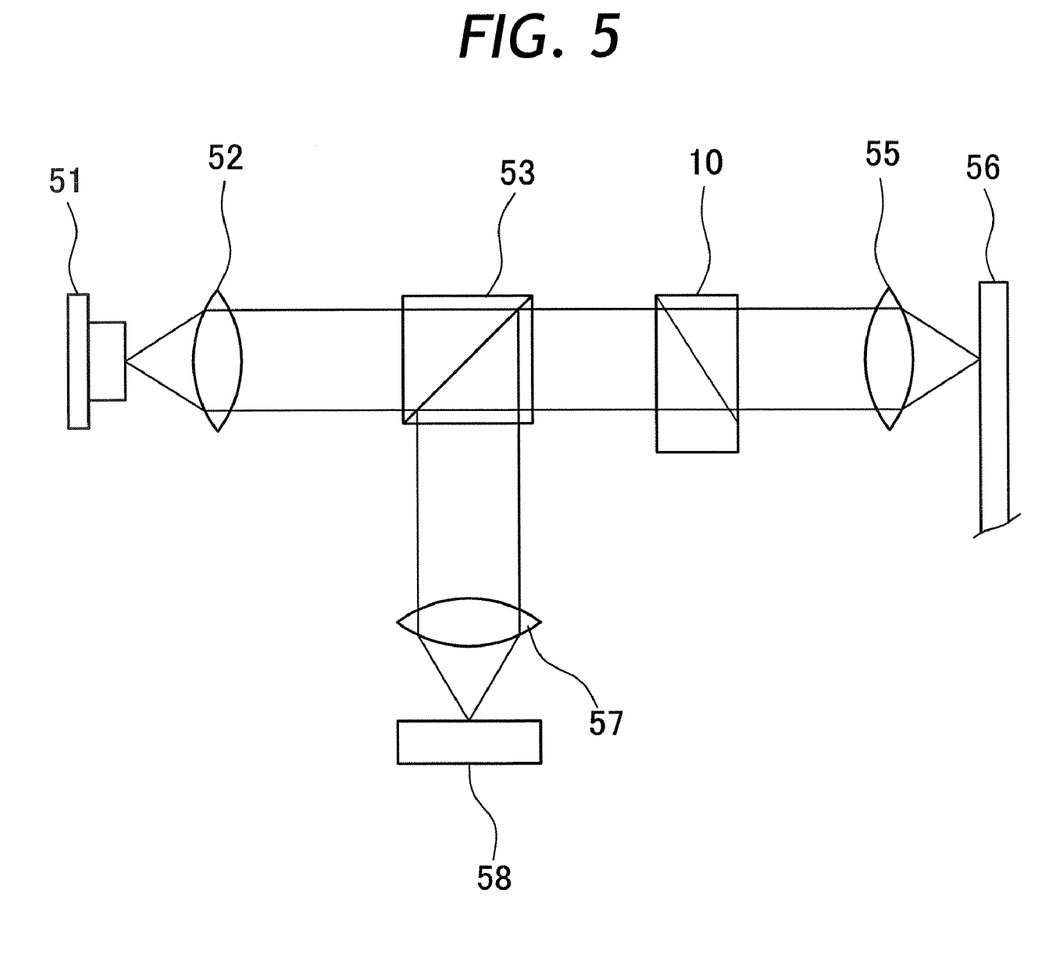
FIG. 5 is a schematic illustration of an optical pickup employing an optical element according to the present invention.

Shown in FIG. 5 is an example of application of the optical element 10 of FIG. 1 to an optical pickup to serve as a λ/4 phase plate. In addition to the optical element 10, the optical pickup of FIG. 5 includes a light source 51, a collimator lens 52, a polarized beam splitter 53, an objective lens 55, an optical disc 56, a converging lens 57 and a sensor 58. Of course, the optical pickup of FIG. 5 is merely one example, and it is to be understood that the present invention is not limited to a particular example shown.

The light source 51 is a laser light source which emits a beam of p-polarized light (Y-polarized light) or s-polarized light (X-polarized light). A light beam projected from the light source 51 is collimated by a collimator lens 52. In this instance, a beam of p-polarized light is projected from the light source 51. A parallel light beam coming out of the collimator lens 52 is fed to a polarized beam splitter 53 with characteristics of transmitting one of p- and s-polarized components of an incident light beam, while reflecting off the other component. In this particular case, the polarized beam splitter 53 has characteristics of transmitting p-polarized light and reflecting off s-polarized light. Thus, the p-polarized light incident on the polarized beam splitter 53 is transmitted as it is, and fed to the optical element 10.

Since (1) the optical multi-layer coating 11 on the optical element 10 is arranged to establish a 90 degrees phase differential between p- and s-polarized light and (2) the optical multi-layer coating 11 is rotated in such a way as to rotate a plane of incidence of the optical element 10 about the optical axis of an incident light beam, p-polarized light incident on the optical element 10 undergoes a change in direction of polarization. As this time, p-polarized light is transmitted as a phase advancing or retarding axis (as a phase advancing axis in this case) and s-polarized light is transmitted as a phase retarding or advancing axis (as a phase retarding axis in this case), bringing about a 90 degrees phase differential between p- and s-polarized components in transmitted light. As a consequence, linearly polarized (p-polarized) incident light is converted into circularly polarized light on transmission through the optical element 10.

Circularly polarized light is then converged toward a spot on a surface of an optical disc 56 by an objective lens 55. Reflected return light from the disc 56 is fed back to the optical element 10 from the objective lens 55. For the same reasons as explained above, return light incident on the optical element 10 is shifted 90 degrees in phase and converted from circularly polarized light to linearly polarized light. At this time, linearly polarized light coming out of the optical element 10 has been shifted 180 degrees in phase in total as compared with p-polarized light initially projected from the light source 51, and therefore has been converted from p-polarized light to s-polarized light. Accordingly, s-polarized light from the optical element 10 is reflected off by the polarized beam splitter 53 to turn the light path through 90 degrees and converged toward a sensor 58 by a condensing lens 57.

As described above, the optical element 10 can be applied to optical pickups. Of course, needless to say, the optical element 20 of Example 1 can be similarly applied to optical pickups.

Example 3

Figure 6:
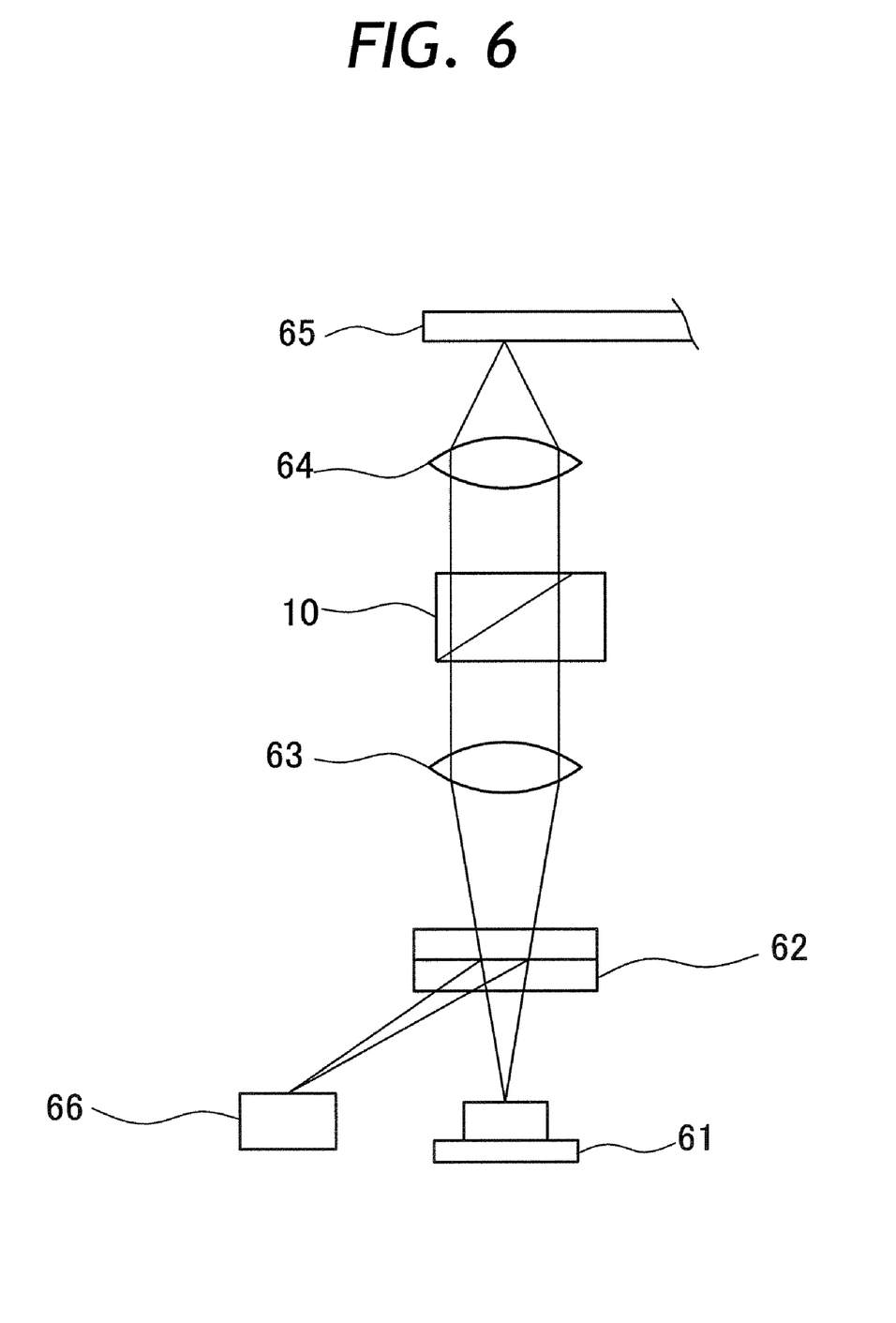
FIG. 6 is a schematic illustration of an optical pickup with a holographic polarized element, adopted another example of application of an optical element according to the present invention.

In this case, the optical element 10 which is arranged to function as a λ/4 phase plate is applied to an optical pickup employing a holographic polarized element. In the case of an optical pickup using a holographic polarized element as shown in FIG. 6, in addition to the optical element 10 of the above-described embodiment, the optical pickup system includes a light source 61, holographic polarized element 62, collimator lens 63, objective lens 64, disc 65 and sensor 66. Shown in FIG. 6 is only an example of optical pickup, and of course application of the present invention is not limited to the particular optical pickup construction shown.

In FIG. 6, p-polarized light (Y-polarized light) or s-polarized light (X-polarized light) is projected from a light source 61. In this particular case, p-polarized light is projected from the light source 61 and fed to a holographic polarized element 62 with a diffraction grating. Diffracting action of the holographic polarized element 62 is invalidated when incident light is p-polarized light, and validated when incident light is s-polarized light. Namely, diffraction occurs to s-polarized light but not to p-polarized light. Accordingly, p-polarized light projected from the light source 61 is transmitted through the holographic polarized element 62 without being diffracted, and collimated into a parallel beam by the collimator lens 63 and fed to the optical element 10. Since the optical element 10 functions as a λ/4 phase plate, p-polarized light is converted to circularly polarized light, and converged toward a disc 65 by an objective lens 64. Light reflection from the disc 65 is fed to the optical element 10 again as return light via the objective lens 64. By the optical element 10, circularly polarized light is converted to s-polarized light, which is collimated into a parallel beam by the collimator lens 63 and fed to the holographic polarized element 62. Since the incident light beam is s-polarized light, it is diffracted by the holographic polarized element 62 to turn its light path toward the sensor 66.

As described above, the optical element 10 can be applied to an optical pickup with a holographic polarized element.

What is claimed is:

1. A wave plate having a plane of light incidence coated with an optical multi-layer coating formed by alternately laminating a high refractivity layer and a low refractivity layer one on another and to transmit one of perpendicularly intersecting polarized components of an incident light beam as a phase advancing axis and to transmit the other polarized component as a phase retarding axis, said plane being set up as a perpendicularly intersecting plane located on perpendicularly intersecting X- and Y-axes in perpendicularly intersecting relation with optical axis of an incident light beam on said optical multi-layer coating, and said perpendicularly intersecting plane being inclined through a predetermined angle relative to said X- and/or Y-axis and rotated through a predetermined angle about a Z-axis corresponding to said optical axis of an incident light beam to let said optical multi-layer coating function as a phase plate.

2. A wave plate as defined in claim 1, wherein said phase plate comprises a λ/4 phase plate.

3. A wave plate as defined in claim 1, wherein said phase plate comprises a λ/2 phase plate.

4. An optical pickup employing a wave plate as recited in claim 1, comprising, in combination with said wave plate which comprises a λ/4 phase plate, a light source to emit an X-polarized light beam polarized in the direction of X-axis or a Y-polarized light beam polarized in the direction of Y-axis, a polarized beam splitter to transmit one of X- and Y-polarized light beams and to reflect off the other one of said X- and Y-polarized light beams, an objective lens to converge a transmitted light beam from said wave plate toward a disc surface, and a sensor to detect return light from said objective lens.

5. An optical pickup employing a wave plate as recited in claim 1, comprising, in combination with said wave plate which comprises a λ/4 phase plate, a light source to emit an X-polarized light beam polarized in the direction of X-axis or a Y-polarized light beam polarized in the direction of Y-axis, a holographic polarized element to validate or invalidate a diffracting action depending upon direction of polarization of an incident light beam, an objective lens to converge a transmitted light beam from said wave plate toward a disc surface, and a sensor to detect return light from said objective lens.

6. A wave plate, comprising:
first and second optical multi-layer coatings each being formed by alternately laminating a high refractivity layer and a low refractivity film one on another and to transmit one of perpendicularly intersecting polarized components of an incident light beam as a phase advancing axis and to transmit the other polarized component as a phone retarding axis;
a first inclined plane set up as a perpendicularly intersecting plane located on perpendicularly intersecting X- and Y-axis in perpendicularly intersecting relation with optical axis of an incident light beam on said first and second optical multi-layer coating and inclined through a predetermined angle about said X- and/or Y-axis; and
a second inclined plane inclined through a predetermined angle about said X- and/or Y-axis in an opposite direction to take a symmetrical position relative to said first inclined plane,
wherein regarding said optical axis as Z-axis, said first inclined plane is rotated about said Z-axis through a predetermined angle relative to a first plane of incidence defined by a normal to said first incline plane and said optical axis to provide a first rotated inclined plane, and said second inclined plane is rotated about said Z-axis through a predetermined angle relative to a second plane of incidence defined by a normal to said second inclined plane and said optical axis, said first and second optical multi-layer coatings being formed on said first and second rotated inclined planes, to let said optical multi-layer coatings function as a phase plate.

7. A wave plate as defined in claim 6, wherein said phase plate comprises a λ/4 phase plate.

8. A wave plate as defined in claim 6, wherein said phase plate comprises a λ/2 phase plate.

9. An optical pickup employing a wave plate as recited in claim 6, comprising, in combination with said wave plate which comprises a λ/4 phase plate, a light source to emit an X-polarized light beam polarized in the direction of X-axis or a Y-polarized light beam polarized in the direction of Y-axis, a polarized beam splitter to transmit one of X- and Y-polarized light beams and to reflect off the other one of said X- and Y-polarized light beams, an objective lens to converge a transmitted light beam from said wave plate toward a disc surface, and a sensor to detect return light from said objective lens.

10. An optical pickup employing a wave plate as recited in claim 6, comprising, in combination with said wave plate which comprises a λ/4 phase plate, a light source to emit an X-polarized light beam polarized in the direction of X-axis or a Y-polarized light beam polarized in the direction of Y-axis, a holographic polarized element to validate or invalidate a diffracting action depending upon direction of polarization of an incident light beam, an objective lens to converge a transmitted light beam from said wave plate toward a disc surface, and a sensor to detect return light from said objective lens.

* * * * *